United States Patent
Dahlquist et al.

[15] 3,635,399
[45] Jan. 18, 1972

[54] PEDOMETER WITH DIRECTION READOUT

[72] Inventors: Ernst A. Dahlquist, 7744 Thornapple Drive, Ada, Mich. 49301; Eric A. Sandberg, 5744 20th Ave. S., Minneapolis, Minn. 55417

[22] Filed: Sept. 23, 1969

[21] Appl. No.: 860,194

[52] U.S. Cl. ................................. 235/105, 73/178, 33/1 R
[51] Int. Cl. ......................................................... G04b 43/00
[58] Field of Search ........................... 235/105; 33/222; 346/8

[56] References Cited

UNITED STATES PATENTS

| 211,280 | 1/1879 | Von Loehr | 235/105 |
| 765,992 | 7/1904 | Porter | 235/105 |
| 1,001,593 | 8/1911 | Hertzberg | 33/222 |
| 3,355,942 | 12/1967 | Freeman | 33/222 X |

FOREIGN PATENTS OR APPLICATIONS

| 278,210 | 9/1914 | Germany | 235/105 |
| 9,101 | 4/1908 | Great Britain | 235/105 |

*Primary Examiner*—Richard B. Wilkinson
*Assistant Examiner*—Stanley A. Wal
*Attorney*—Price, Heneveld, Huizenga & Cooper

[57] ABSTRACT

An integrating pedometer, to be carried by a person walking, having a pendulum pedometer movement, a spring-loaded escapement assembly which suddenly reciprocates a needle at distance-related periodic intervals, a compass assembly which positions said needle as a function of the direction of travel, a sphere which is turned by said sudden reciprocation of said needle, a north-south register wheel and an east-west register wheel contacting said sphere to register the rotation thereof, and a readout assembly including a dial to indicate the distance and direction back to the point of origin.

15 Claims, 8 Drawing Figures

PATENTED JAN 18 1972

INVENTORS
ERNST A. DAHLQVIST
ERIC A. SANDBERG

BY
Price, Heneveld
Huizenga & Cooper

ATTORNEYS

INVENTORS
ERNST A. DAHLQUIST
ERIC A. SANDBERG.

ATTORNEYS

INVENTORS
ERNST A. DAHLQUIST
ERIC A. SANDBERG

BY
ATTORNEYS

PEDOMETER WITH DIRECTION READOUT

BACKGROUND

In this age of mobility and travel, navigating instruments have become a vital necessity to our way of life. Instruments used in ships and airplanes have become particularly sophisticated. However, another type of travel has become extremely popular as a source of recreation. Walking, whether it be to a favorite fishing spot, or while deer hunting, or while bird hunting, or just for the sake of exercise has become extremely popular. People have more money to spend on outdoor activities and on traveling to nature's wild and secluded wonderlands. Hence, navigational instruments which facilitate hiking in unknown territories have enjoyed a considerable increase in demand.

The basic instrument to hunters and woodsmen is the simple compass. This instrument can be used in any weather under any sky to tell him the direction he is traveling. Another instrument which has gained some popularity, although certainly not as much as the compass, is the pedometer. This instrument can be adjusted according to the length of the person's stride and can be used by a person carrying it to determine how far he has traveled. If a person wants to know his distance and direction from his point of origin in an unfamiliar territory, he can combine the information obtained from his compass and his pedometer and use a pencil and paper to determine this information. However, such a determination requires considerable care in recording data. Every time the person changes direction, he must record the distance which he has traveled thus far in the direction which he was previously traveling, and record his new direction of travel. Then when he decides that it is time to return to his point of origin, he must sit down with a pencil and paper and carefully triangulate all of the distances he traveled in each particular direction. Obviously if a person makes very many changes in direction, his calculation is going to be an extremely difficult one. Furthermore, if one is particularly intent on tracking a deer or is particularly interested in the scenery about him, or is otherwise careless about recording the necessary data, he will find that it is absolutely impossible for him to make the necessary calculations in order to determine his point of origin. In actuality, very few people and probably no hunters take the time and care which is necessary to record this data and to make these calculations. Rather, they generally attempt to bound the area in which they are hunting or traveling by landmarks, such as roads, railroad tracks, powerlines, etc. When lost, they simply travel in a fixed direction which will carry them to one of these boundaries, and then walk the boundaries back to their point of origin. Frequently, this method leads to lost hunters. A road believed to be straight turns out to be winding, and thus winds completely out of the territory in which he has been hunting. At best, he frequently ends up walking miles farther then would have been necessary. To date, no one has provided a navigational instrument which is sufficiently simple and lightweight, but also sufficiently accurate to solve this navigational dilemma of the walker.

SUMMARY

This invention is a distance- and direction-integrating pedometer by which a person walking knows the distance and direction from his point of origin at all times, without the need for manually recording data and making numerous calculations. It comprises a pedometer means which monitors each step of the person carrying it and a compass means which monitors the direction of travel at all times. This information is automatically and continuously integrated by an integrating means which registers the distance and direction traveled from a particular point. An escapement means transfers the energy of the pedometer action means to the integrating means, while the compass means acts to transfer direction information to the integrating means. Finally, there is a readout means which makes the information provided by the integrating means cognizable to the person carrying the instrument.

Thus, this invention signifies a great step forward in the art of navigation by a person walking. Whenever a person is walking in unfamiliar territory and desires to return to his point of origin, he can use the information provided by the instrument to simply and accurately determine the distance and direction traveled from the point of origin. Better still, one can merely walk in such a direction that the readout means returns toward a zero indication. When the zero point is reached, one will be standing at his point of origin. The device is readily adjustable to the stride of any particular individual. There is actually no need whatever to carry a pencil and paper when using the device. There is certainly no need to take readings or make calculations every time one changes direction. The device is sufficiently compact to be carried in a vest pocket or on a belt. Yet, it is sufficiently accurate that there is not need to wander over many unnecessary miles in order to find the point of origin. There is never any need to worry about determining boundaries for the area being explored or hunted. Thus, there is never any need to worry about a road or a creek which might curve away in the distance and thus lead only to confusion and hopelessly lost direction. Finally, the device id designed so that it can be economically manufactured and sold; thus, people who can afford even modest expense for hunting, camping, fishing, and hiking equipment, will find this invention an invaluable and necessary commodity.

DRAWINGS

The foregoing and other objects and advantages of this invention can be visualized by reference to the written description and appended drawings wherein.

DESCRIPTION

Figure 1:
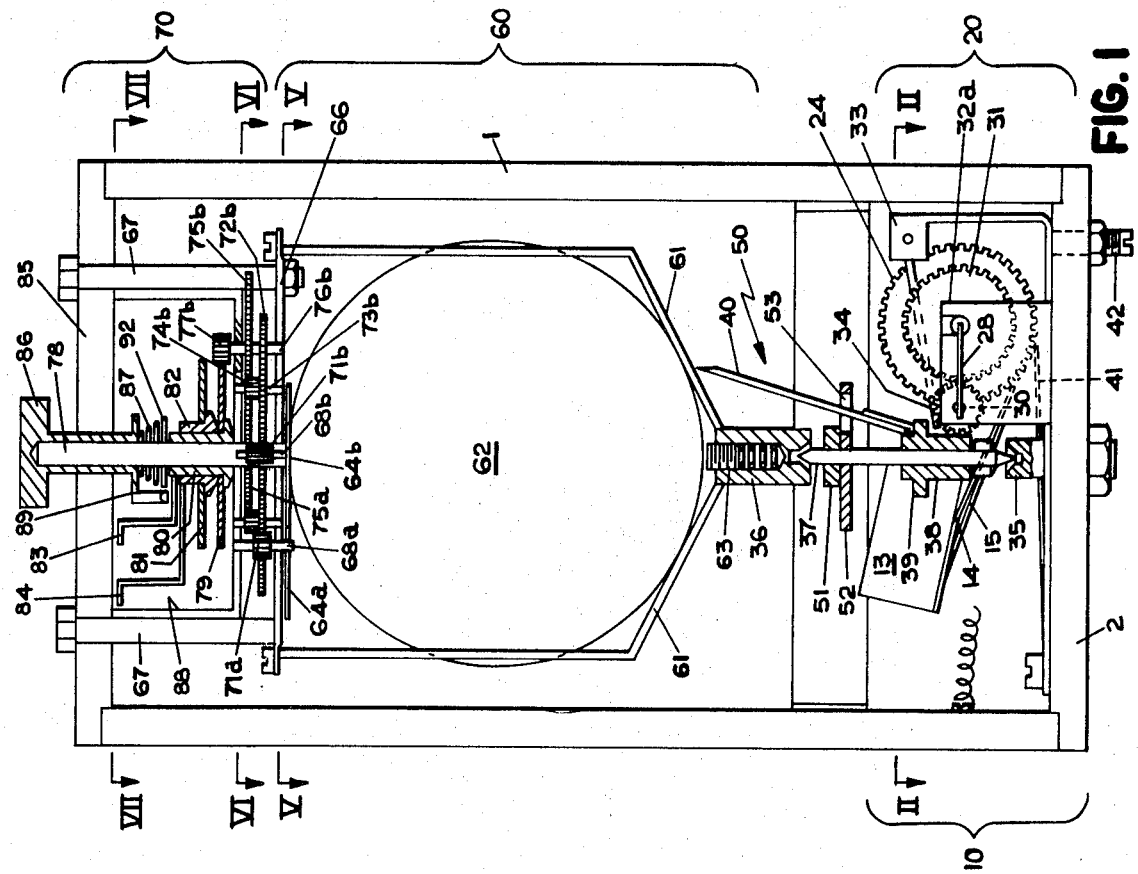
FIG. 1 is a sectional side view of the invention.

Referring more specifically to the drawings, the basic subassemblies of the invention can be seen in FIG. 1 and include a pedometer action or movement 10, an escapement assembly 20, a compass assembly 50, an integrating assembly 60, and a readout assembly 7. The entire device is enclosed in a cylindrical housing 1 which is made of a nonmagnetic material. It is capped on the bottom by bottom plate 2 which is made of the same type of material. The top plate of the housing is dial plate 85 which is made of a material such as a clear plastic and has dials printed thereon. All of the component parts of the invention, with the exception of a compass needle 51, are made of nonmagnetic materials, such as aluminum.

Figure 2:
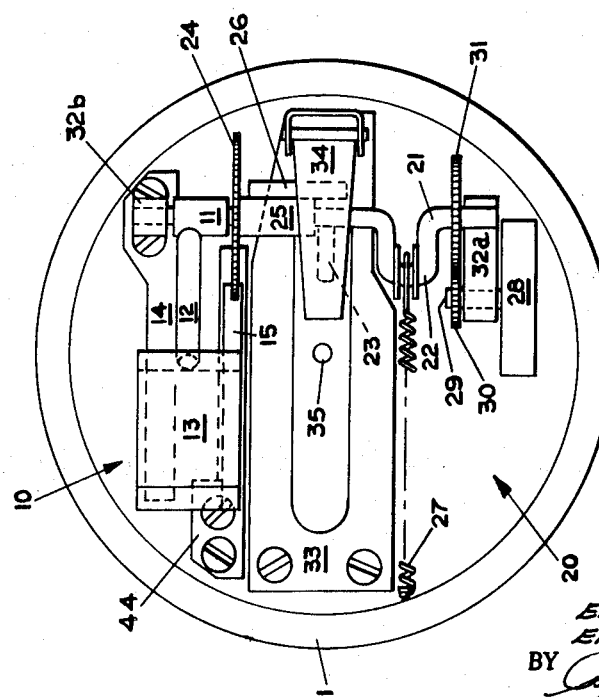
FIG. 2 is a sectional plan view taken along plane II—II of FIG. 1.
Figure 3:
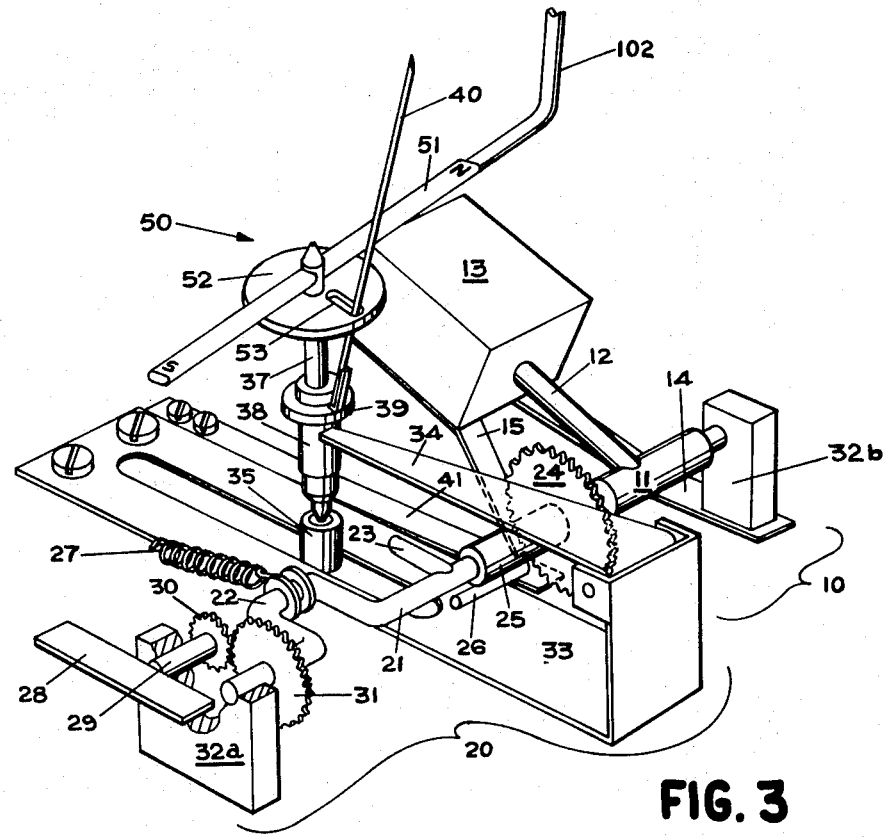
FIG. 3 is an enlarged perspective view of the pedometer action, escapement assembly, and compass assembly of the invention.

Pedometer action 10, which is basically an inertia pendulum apparatus, is best seen in FIGS. 2 and 3. Pendulum weight 13 is a heavy weight mounted on the end of a pendulum shaft 12 which extends outwardly from and is secured to an elongated tubular shaft 11. Shaft 11 is rotatably mounted on an axle 21 which extends through it. Axle 21 is rotatably mounted at one end in a bearing block 32a and at its other end in another such bearing block 32b, both of which are secured to bottom plate 2. A pendulum spring 14, comprising a flat, thin piece of spring metal is mounted at one end between bottom plate 2 and bearing block 32b. This spring element is bent slightly upward and away from bottom plate 2, and extends beneath pendulum weight 13, to support the later and bias it in the position indicated in FIGS. 1 and 3. Pendulum weight 13 and spring 14 are not connected but rather pendulum weight 13 merely rests against spring 14 and is free to slide with respect thereto. A gear drive finger 15 is secured to the bottom of pendulum weight 13 and is bent slightly downward and away therefrom, toward an escapement gear 24 of the escapement assembly 20. The free end of gear drive member 15 is engageable with the teeth in escapement gear 24 to rotate the latter incrementally upon downward movement of the pendulum weight.

Axle 21, mentioned above, is also common to escapement assembly 20, which is best seen in FIGS. 2 and 3. Rather than being completely straight, axle 21 bends outwardly into a lateral U-shaped extension or crank portion 22. Escapement gear 24 is concentrically mounted upon a tubular shaft 25 which is rotatably mounted on axle 21 and which is comparable to shaft 11, mentioned previously. Escapement gear 24 has regularly spaced teeth which are of a size appropriate to receive the gear drive member 15 of pedometer action 10. An escapement gear stop 41 is provided, in the form of a long, thin, flat piece of spring material which is secured at one end to bottom plate 2 and which, at its other end, is elevated slightly from the bottom plate 2 to engage the teeth in escapement gear 24 to allow it to be rotated in one direction while preventing it from being rotated in the opposite direction. Firmly secured to the tubular shaft 25 mounting escapement gear 24 and disposed parallel to both shaft 25 and axle 21 is a stub shaft 26 comprising an actuating pin which extends longitudinally beyond the end of shaft 25. A cam 23 in the form of a short lateral shaft is secured to axle 21 such that it is perpendicular thereto. Cam 23 is located near the end of tubular shaft 25 and in alignment with actuating pin 26, for engagement by the latter upon rotation of gear 24 and its shaft 25. A coil spring 27 of a nonmagnetic material is secured at one end to cylindrical housing 1 and rotatably secured at the other end to the crank 22 of axle 21. In order to dampen rapid rotation of axle 21, a damping blade 28 is mounted on the end of a shaft 29 which is journaled in axle-mounting block 32a. At the other end of shaft 29 is a small gear 30 whose teeth are engageable with the teeth of a larger gear 31 which is securely mounted on axle 21.

Vertical inner shaft 37 (FIGS. 1 and 3) is a straight shaft perpendicular to axle 21 and having pointed ends which are carried in concave bearing surfaces of a base mount 35 and a top mount 36. Base mount 35 is secured to bottom plate 2, while top mount 36 is secured indirectly to dial plate 85. An outer shaft 38 comprising a sleeve element which is shorter than vertical inner shaft 37 is slideably mounted on the latter. Outer shaft 38 has a lip 39 which extends outwardly from it around its entire circumference. An elongated needlelike member 40 is secured to the upper surface of lip 39 and extends upwardly therefrom at about a 30° angle from vertical shaft 37.

The components associated with axle 21 and the components associated with vertical shaft 37 are operably associated through a lever 34 which is a thin flat member hingedly mounted on a bracket 33 in vertical alignment with the aforementioned cam 23. Bracket 33 is a flat, thin piece of stiffly flexible spring material bent into somewhat of an "L," having a leg and a base. The leg lies generally against bottom plate 2 and is secured thereto at its end opposite axle 21. Since it passes through the center of baseplate 2, at which point the pivot mount 35 is located, a slot is provided in the leg of bracket 33 to accommodate the mounting of such pivot mount. The base of the L-shaped bracket 33 extends upwardly generally perpendicular to bottom plate 2, behind axle 21. Lever 34 is hingedly mounted at the top of bracket 33 at this point and extends out over cam 23 toward vertical inner shaft 37. The end of lever 34 rests below lip 39 on outer shaft 38, such that it is engageable there beneath (FIGS. 1 and 3). Thus, when cam 23 engages lever 34, the end of lever 34 will engage lip 39 of outer shaft 38. Finally, an adjustment screw 42 is provided (FIG. 1), extending through bottom plate 2 to a point beneath the lever-mounting bracket 33. Adjustment screw 42 can be turned either up or down such that the free end of bracket 33, to which lever 34 is mounted, can be either raised or lowered.

Compass assembly 50 (FIGS. 1 and 3) includes a bar magnet or needle 51 and direction register disk 52. Compass needle 51 is mounted on vertical inner shaft 37 near the top thereof. Direction register disk 52 is a small wheel or plate mounted on vertical inner shaft 37 just below compass needle 51. Disk 52 has a radial slot 53 through which the aforementioned needle 40 extends. Slot 53 is sufficiently large to allow needle 40 to spring slightly away from vertical shaft 37 and to allow for slight movements of compass needle 51 due to vibrations rather than to a change in direction. At this point, it should be noted that while the shaft to which compass needle 51 is secured, i.e., vertical shaft 37, should be relatively freely rotatable, this rotation should be dampened to the extent that compass needle 51 should respond generally only to a change in direction rather than to the vibrations and energy which might be imparted to it by the walking motions of the person carrying it.

The heart of integrating assembly 60 (FIG. 1) is sphere member 62 which has a hard metal core and a hard rubber surface. It is maintained in a sphere-housing spider 61 which is a three-fingered cage extending upwardly to a housing plate 66. Each finger is as slender as possible so as not to interfere with sphere-rotating needle 40 when it makes contact with sphere 62. Each finger of spider 61 is spaced equidistant from the others and secured at its bottom end to the upper pivot mount 36, from which each extends outwardly at about a 30° angle to the horizontal along the lower portion of sphere 62 and then extends vertically upward, contacting the equator of sphere 62. The upper end of each finger of spider 61 is secured to top housing plate 66, which is a circular flat plate disposed in a horizontal plane immediately above sphere 62. Four equally spaced mounting bolts or posts 67 are secured at one end to sphere-housing plate 66 and at the other end to dial plate 85. As discussed previously, dial plate 85 is secured to cylindrical housing 1. In this fashion, sphere-housing plate 66, sphere-housing spider 61, and the upper pivot mount 36 for compass shaft 37 are held in a fixed position inside of cylindrical housing 1.

Extending upwardly from inside the top pivot mount 36 is a sphere damper 63, which is a spring-biased pin which acts upwardly against sphere member 62 to dampen the rotation thereof. In other respects, sphere 62 is generally freely rotatable about any other axis within the confines of housing spider 61 and housing plate 66.

Figure 5:
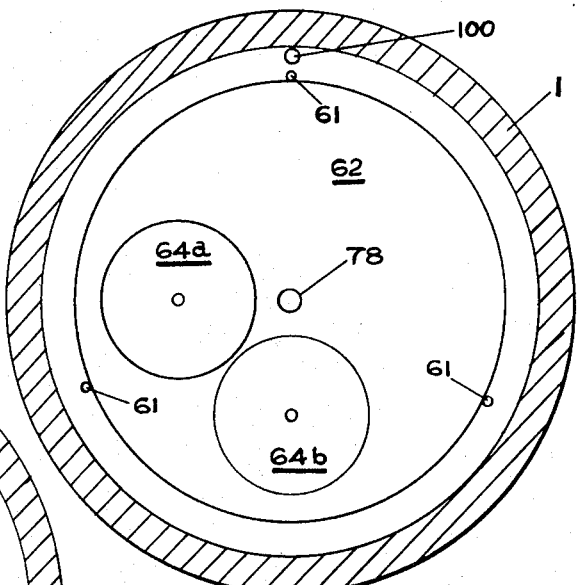
FIG. 5 is a sectional plan view taken along plane V—V of FIG. 1.

Two register wheels, north-south register wheel 64a and east-west register wheel 64b, are mounted on the ends of register wheel axles 68a and 68b, respectively, which extend upwardly through sphere-housing plate 66 (FIGS. 1 and 5). Register wheels 64a and 64b lie generally in a horizontal plane when cylinder housing 1 is held in a vertical position, and each makes contact along its respective circumference with sphere member 62. The points of contact of each register wheel 64a and 64b with sphere 62 lie on a common minor circle of the sphere, the plane of which is also generally horizontal; also, each such point of contact lies on a different great circle whose planes are perpendicular to such minor circle and perpendicular to each other. The aforementioned minor circle lies in a plane which is quite near the top or north pole of sphere member 62.

Figure 6:
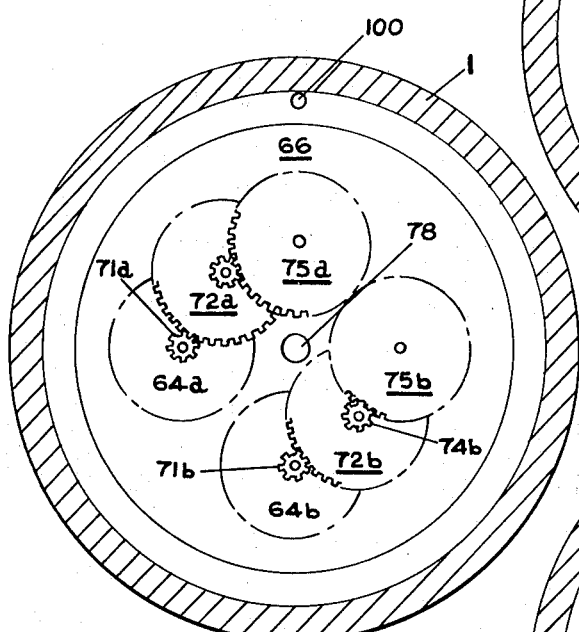
FIG. 6 is a sectional plan view taken along plane VI—VI of FIG. 1.

Register wheel axles 68a and 68b pass through sphere-housing plate 66 and their upper ends are mounted in a dishlike member 88 (FIGS. 1 and 7), which is a shallow dished structure in the nature of a cylindrical cup. Member 88 is secured to sphere-housing mounting posts 67 and there is a space between its bottom surface and sphere-housing plate 66, in which space is located most of the gearing of readout assembly 70. The latter includes a pair of pinions 71a and 71b mounted on register wheel axles 68a and 68b, respectively, comprising the first gears in each of two gear reduction trains. The gear reduction train beginning with pinion 71a acts to reduce for readout purposes the rotation of north-south register wheel 64a, which is shown alone in FIG. 5 and shown in its environment in FIGS. 1, 4 and 6. The teeth of pinion 71a engage the teeth of an intermediate gear 72a, which rotates on an intermediate gear axle 73a, which is mounted at one end in sphere-housing plate 66 and at the other end in dish member 88. Fixedly mounted on axle 73a and closely adjacent intermediate gear 72a is a second pinion 74a, whose teeth engage those of final gear 75a which is mounted on an axle 76a having one end mounted in sphere-housing plate 66 and being mounted in and passing through the bottom of dish member 88. Mounted on that end of final gear axle 76a extends up into dish member 88 is a final drive pinion gear 77a, whose function and purpose is referred to subsequently. The gear reduction train for east-west register wheel 64b is of an identical construction, having a primary pinion gear 71b, an intermediate gear 72b engaged with the latter and mounted on an axle 73b, a second pinion gear 74b driven by gear 72b and mounted on an axle 73b, a final major gear 75b driven by pinion 74b and mounted on an axle 76b, and an output drive pinion 77b mounted on that end of an axle 76b which extends up into dish member 88.

Figure 7:
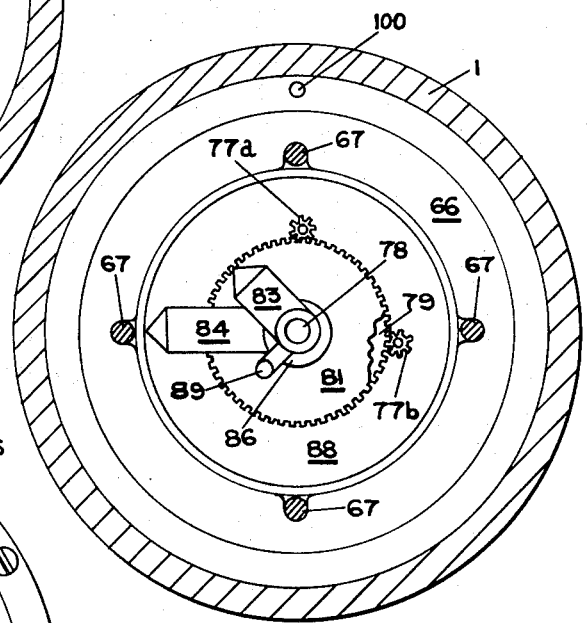
FIG. 7 is a sectional plan view taken along plane VII—VII of FIG. 1.

The teeth of drive pinion 77a engage the teeth of a north-south readout gear 81 (FIGS. 1, 4 and 7), while the teeth of drive pinion 77b engage the teeth of an east-west readout gear 79 (FIGS. 1 and 7). Readout gears 79 and 81 are coaxially mounted on a center shaft 78 which is firmly mounted at its bottom in sphere-housing plate 66 and which extends upwardly through dial plate 85 (FIG. 1). East-west readout gear 79 is secured to an inner hollow shaft or sleeve 80 which is rotatably telescoped over center shaft 78, while north-south readout gear 81 is secured to an outer hollow shaft or sleeve 82 which is rotatably telescoped over inner hollow shaft 80. East-west readout needle or indicator 83 is secured to and extends outwardly from inner hollow shaft 80, while north-south readout needle 84 is secured to and extends outwardly from outer hollow shaft 82. Each of the readout needles 83 and 84 is bent vertically upward at some distance from its respective shaft 80 or 82 and then horizontally outwardly again just below dial plate 85. East-west readout needle 83 is shorter than north-south readout needle 84 and when rotated describes a smaller circle than north-south readout needle 84. Dial plate 85 has a north-south dial 90 (FIG. 8) which corresponds to north-south readout needle 84, and also has an east-west dial 91 which corresponds to east-west readout needle 83. Each of said dials 90 and 91 has divisions which indicate a particular distance, and each has a zero point. The divisions on north-south dial 90 which mark the right half thereof as viewed in FIG. 8 indicate the distance which a person has traveled south from his point of origin while the divisions marking the left half thereof indicate the distance which he has traveled north from his point of origin. Similarly, the divisions which mark the right half of east-west dial 91 indicate the distance which a person has traveled west of his point or origin while the divisions which mark the left half thereof indicate the distance which he has traveled east from his point of origin.

Figure 4:
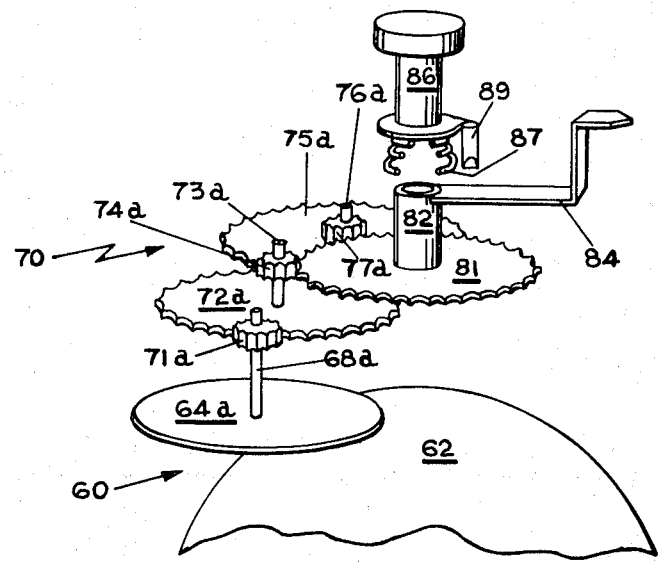
FIG. 4 is an exploded perspective view of a register wheel on the sphere and its associated readout assembly.

In order to set north-south and east-west readout needles 81 and 83 on their respective zero points, a knob 86 is rotatably mounted on top of center shaft 78 (FIGS. 1 and 4). Knob 86 is biased in a normally upward position (shown in FIG. 1) by a coil spring 87, whose bottom rests on a disk 92 desired to center shaft 78 and whose top bears against the reset knob 86. Extending downward from the bottom of the knob 86, which is spool-shaped, and offset laterally of the spring 87 and disk 92, is a needlelike reset pin 89. Reset pin 89 extends sufficiently below the bottom of knob 86 as to pass through the horizontal planes of needle 83 and 84 when knob 86 is depressed. Thus, when reset knob 86 is depressed and then rotated, the pin 89 contacts east-west and north-south readout needles 83 and 84, respectively, and will rotate the latter to align the indicator tips with the zero points on their respective dials 90 and 91.

Figure 8:
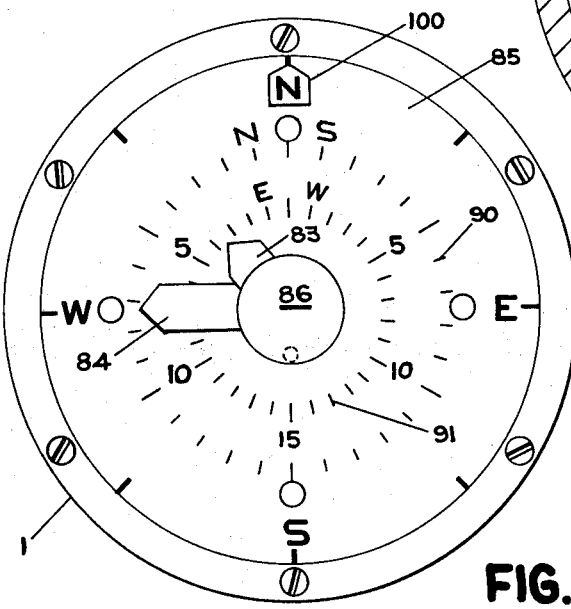
FIG. 8 is a top plan view of the invention.

Finally, the instrument is completed by a pointer 100 which is disposed just below the surface of dial plate 85, approximately in the plane of readout needles 83 and 84 (FIG. 8). Pointer 100 is secured to a long slender shaft 102 (FIG. 3) which extends downwardly therefrom in the space between sphere-housing spider 61 and cylindrical housing 1 and then bends inwardly and is secured to the vertical inner shaft 37, which supports compass magnet 51, such that the position of the pointer corresponds at all times to the direction in which compass needle 51 is pointing (FIG. 3). As indicated in FIG. 8, the quadrant markings of a compass dial are printed on dial plate 85 near its circumference.

OPERATION

With the construction and relationship of the various parts of the invention thus described, the operation thereof can be readily ascertained. The user wears the instrument with a particular, fixed side always facing his direction of travel, so that the distance travelled in a particular direction will be properly indicated on readout dials 90 and 91. If a particular side of the instrument were not facing forward, the carrier might find that his distance travelled in a northerly direction is being consistently indicated as travel in an easterly direction. By the same token, if that particular side did not remain fixed facing his direction of travel, he might find that the distance he is traveling in a particular direction is being indicated as distance travelled in a number of different directions. This fixed and particular orientation of the instrument may readily be accomplished in a number of ways, such as, for example, securely and rigidly mounting the instrument in a holder having a shape adapted to fit flatly into a shirt pocket, or simply by rigidly securing an attachment clip or pin to the instrument housing. In this way, the particular side of the instrument which should face in the direction of travel could be fixedly oriented on the person of the user.

As the user begins walking, he instrument moves up and down with every step, attaining a maximum upward position generally in the middle of each step. Due to its inertia, pendulum weight 13 will move downward relative to the cylindrical housing 1 and the rest of the instrument generally. In so doing, it will move gear member 15 against escapement gear 24, to engage the teeth of the latter and cause it to rotate in a counterclockwise direction as viewed in FIG. 1. Escapement gear stop 41 also engages the teeth of escapement gear 24, and will prevent clockwise movement thereof. It will not prevent counterclockwise rotation, however, because its angle of engagement is almost tangential and because it is slightly springy, such that the teeth on escapement gear 24 merely contact its upper surface and force it downwardly and out of the way as a tooth slips past. As the user finishes his stride, pendulum spring 14 will cause pendulum weight 13 to move upwardly with respect to cylindrical housing 1 and return to its original position. Because gear drive member 15 is also almost tangentially oriented with escapement gear 24, and because it also is slightly springy, its end will merely be slightly depressed by and slide past the teeth of escapement wheel 24. On the other hand, the teeth of escapement gear 24 will now tend to rotate directly against the end of escapement gear stop 41, and thus escapement gear 24 will be prevented from rotating in a clockwise direction as viewed from FIG. 1. Therefore, escapement 24 will be rotated in only one direction and furthermore will do so only under the force of gear drive member 15, since the contact of both gear drive member 15 and escapement gear stop 41 against escapement gear 24 prevent any free rotation thereof.

As escapement gear 24 rotates step by step, the tubular member 25 and the engaging pin 26 attached to the latter will correspondingly rotate about axle 21. Energy-storing spring 27 normally keeps axle 21 biased in a position in which crank 22 lies in the position indicated in FIG. 3. However, as engaging pin 26 is rotated about axle 21, it will eventually contact cam 23 and the action thereof against cam 23 will cause axle 21 to rotate with escapement gear 24. As this happens, crank 22 will gradually rotate out of the plane of energy-storing spring 27 and begin stretching or extending spring 27. Because energy-storing spring 27 is rotatably connected to the crank 22, it will not tend to wind around axle 21 as the latter rotates. After axle 21 has been so rotated through 180°, crank 22 will again lie in the same plane as energy-storing spring 27, and the latter will have acquired the maximum energy which crank 22 is capable of imparting to it. As axle 21 rotates through this point, energy-storing spring 27 will suddenly cause it to rotate another 180°, back to its initial position, since the tension in spring 27 will no longer be resisted by the engagement of pin 26 against cam 23. While this rotation through the second 180° will be extremely rapid, it will be dampened to some extent and smoothed by the action of damping propeller 28. That is, damping gear 31 on axle 21 rotates with axle 21 and its teeth engage the teeth of propeller drive gear 30 which is mounted on propeller axle 29. Thus, when axle 21 rotates rapidly, propeller 28 will also rotate rapidly and air resistance to the rotation of the flat propeller blade will impede its rotation and dampen the rotation of axle 21.

As axle 21 rapidly rotates through this second 180°, the end of cam 23 will engage lever 34 and push or cam the free end thereof upwardly as it movement. across the undersurface thereof. The free end of lever 34 will in turn engage lip 39 on outer shaft 38 and correspondingly push outer shaft 38 and sphere-rotating needle 40 upwardly toward sphere member 62 in a quick pulse or snapping action. The sharp end of sphere-rotating needle 40 engages the outer surface of sphere member 62 and rotates sphere member 62 an incremental amount, since its angle of attack on the surface of sphere member 62 tends to be tangential rather than directly toward the center of sphere member 62. When cam 23 is engaging lever 34 and is perpendicular thereto, lever 34 will have attained its maximum upward movement After this, its end will fall back to its original position and the slideable outer shaft 38 and sphere-rotating needle 40 will also return to their original positions. In this return movement, sphere-rotating needle 40 will merely slide along the surface of sphere member 62 due to its generally tangential orientation thereto, and will move out of contact with the sphere upon returning to its original position. The spring-loaded sphere damper 63 aids in preventing sphere member 62 from rotating back to its original position during the return movement of sphere-rotating needle 40.

Compass needle 51 will always tend to point in a northerly direction; therefore, as the carrier changes his direction, compass needle 51 and direction register disk 52 will rotate with respect to cylindrical housing 1 and the rest of the instrument generally. Direction register disk 52 when so moved will also cause sphere-rotating needle 40 and the slideable outer shaft 38 on which it is mounted to rotate in the same manner, since sphere-rotating needle 40 extends through slot 53 in direction register 52. Thus, the particular axis through the center of sphere member 62 about which the latter is rotated by an upward thrust of needle 40 depends on the particular direction in which the user is traveling, since it is directly related to the instantaneous position of the compass magnet 51. Because sphere-rotating needle 40 extends upwardly in a generally vertical plane which is perpendicular to dial plate 85 and bottom plate 2, needle 40 will always cause sphere member 62 to rotate about some axis which is parallel to dial plate 85 and bottom plate 2, and which therefore is generally horizontally oriented. Sphere member 62 might be rotated about any axis which lies in a plane parallel to dial plate 85 an bottom plate 2, the particular axis of rotation at any one time being a direct function of the direction of travel of the person carrying.

Because both register wheels 64a and 64b have their circumference in contact with sphere 62, either or both may be rotated by sphere member 62, when it is rotated by an upward thrust of sphere-rotating needle 40. The "circle of rotation" for each register wheel 64a and 64b will be that circle on the surface of sphere 62 which passes through the point of contact with sphere 62 and which is perpendicular to the axis of rotation of sphere 62. If the direction of travel is due east or due west, the circle of rotation for north-south register wheel 64a is the great circle passing through the point of contact with sphere 62; consequently, under these conditions the north-south wheel 64a will not rotate. Instead the sphere will merely skid against this wheel. On the other hand, under these conditions the circle of rotation for the east-west register wheel 64b is that minor circle on the surface of sphere 62 which is tangential to and coplanar with register wheel 64b, and the rotation of the latter will be the maximum possible. Just the opposite will be true if the carrier is travelling due north or due south. If the carrier's direction of travel is other than due north, south, east, or west, it is apparent that the extent to which each register wheel 64a or 64b rotates in response to an incremental rotation of sphere 62 will depend on the degree to which its circle of rotation approaches being tangent to it. When the carrier is travelling either directly northwest or directly southeast, or directly northeast or directly southwest, it is apparent that register wheels 64a and 64b will rotate exactly the same amount at exactly the same speed, since their respective circles of rotation will be disposed at 45° angles to their great circles.

It should be noted that register wheels 64a and 64b are disposed quite near the top of sphere member 62 and that consequently their circles of rotation have radii which are almost as great as the radii of the sphere. Thus, for example, the rotation of east-west register wheel 64b when its circle of rotation is its tangent minor circle will be greater than would be its rotation under the same circumstances if it were disposed closer to the equator of sphere 62. Its response to any rotation in sphere member 62 is almost as great as it would be if its point of contact with sphere member 62 were exactly at the top of sphere member 62. On the other hand, it should be noted that register wheels 64a and 64b are not disposed exactly at the top of sphere member 62 but are rather disposed a short distance downwardly therefrom. This is necessary in order to increase the direction resolution of register wheel 64a and 64b. If register wheels 64a and 64b were disposed even farther from the top of sphere 62 and closer to its equator, it is apparent that they would respond even more accurately to the direction of travel of the person carrying the instrument and would be more responsive to any changes in direction. However, there is obviously a conflict between distance resolution and direction resolution and it has been found that positioning the register wheels 64a and 64b as indicated in FIG. 1 offers an optimum compromise between distance and direction resolution. Since the compass will tend to oscillate or hunt to some extent any way due to the walking motion of the person carrying, the emphasis has been placed on distance resolution. Thus, register wheels 64a and 64b will tend to pick up a change in position of compass needle 51 only if it is an appreciable change due to an actual change of direction of the person walking, and minor changes in the position of compass 51 due to brief erratic motions of the carrier will not register significantly.

Rotation of register wheels 64a and 64b is translated into readable data by means of the readout assembly 70. The gear reduction trains associated with register wheels 64a and 64b reduce the amount of rotation of the indicating hands or readout needles 83 and 84 for a given rotation of the register wheels; otherwise, readout needles 83 and 84 would rotate through 360° in a matter of only a few hundred yards. By using reduction gearing, the effective loading of the integrating sphere 62 caused by driving the readout needless is reduced as much as possible, to increase the accuracy of the instrument.

Finally, the user may adjust the instrument to the length of his stride by turning adjusting screw 42 (FIG. 1) either upwardly or downwardly. If turned upwardly, one end of the mounting bracket 33 is raised, thereby raising the pivot point of lever 34. Since axle 21 remains in a fixed position, lever 34 will in effect be moved farther away from the axle and closer to the circumference of the circle described by the camming surface or end of cam 23 as it rotates about axle 21. This means that cam 23 will contact lever 34 at a point closer to its free end and hence will push it upward of a lesser extent. If adjusting screw 42 is lowered, the hinged end of lever 34 will move toward cam 23 and will thus be pushed upwardly a greater distance. Thus, a person with a stride of only 2 feet will turn adjustment screw 42 up higher than a person having a stride 3 feet long.

In order to further illustrate the operation of the device, a possible course taken by a hiker or hunter will be discussed which would lead needles 83 and 84 to the positions indicated in FIG. 8 from a starting position of zero. At the beginning of the day, the person sets needles 83 and 84 to a zero position by using the reset knob 86. He begins walking in a direction which is generally north by northwest. Each time that a mechanical pulse from the pedometer movement imparts motion to sphere 62, the east-west register wheel 64b rotates in a clockwise direction as viewed in FIG. 5 while north-south register wheel 64a rotates to a greater extent in a counterclockwise direction. After walking a given distance of 5 units (hundreds of yards, miles, etc.) in this direction, readout needle 83 will be pointed toward the third division from zero on the west half of the east-west dial 91, and north-south readout needle 84 will be pointed toward the fourth division on the north half of north-south readout dial 90. If the user then changes direction and travels due east, each time sphere 62 now rotates there will be no rotation of north-south register wheel 64a and maximum rotation of east-west register wheel 64b. East-west readout needle 83 will begin moving back toward zero on east-west readout dial 91. After walking 3 units due east, east-west readout needle 83 will point directly toward zero on east-west readout dial 91, while north-south readout needle 84 will still be pointed toward the fourth division on the left half of north-south readout dial 90.

At this point, the user may decide to return to his point of origin, in which case he would merely being walking due south until north-south readout needle 84 returns to its zero position. However, if he decides instead to begin walking in a direction which is east by northeast, each incremental movement of sphere 62 will rotate north-south register wheel 64a in a counterclockwise direction once again (as viewed from FIG. 5), while east-west register wheel 64b will rotate to a greater extent, also in a counterclockwise direction. After walking 5 units in an east by northeast direction, the readout needles 83 and 84 will be in the relative positions indicated in FIG. 8, i.e., north-south needle 84 will be pointed toward the seventh division on the left half of north-south dial 90, while east-west needle 83 will be pointed toward the fourth division on east-west dial 91.

At this point, if the user decides to return to his point of origin, he can do so accurately in two different ways. If he is mathematically inclined, he might calculate by triangulation his exact distance and direction from his point of origin. Since he is 7 miles north and 4 miles east of this point of origin, his calculations would indicate that he has to walk about 8 miles in a direction generally south by southwest. In fact, however, no calculations are actually necessary in order for him to return accurately to his point of origin. All he need do is to merely being walking and adjust his direction of travel such that both needles 83 and 84 move towards the zero points on their respective dials 90 and 91. Furthermore, he can guide his direction such that his north-south readout needle 84 is moving toward zero faster than is his east-west readout needle 83. Of course, the user need not wander aimlessly until the needles started moving in the direction desired, but rather he can roughly estimate the direction in which he should travel in order to return to his point of origin, and by using north pointer 100 he could direct himself in that approximate general direction. As readout needles 83 and 84 moved closer to zero on their respective dials 90 and 91, he would find that he was drawing nearer to his point of origin. When the needles finally registered at zero, he will have arrived at his point of origin.

In this embodiment shown in FIG. 8, each dial 90 and 91 is divided into two halves, each half having 15 unit divisions thereon. If a person walks in a direction such that north-south needle 84 moves clockwise down the right half of north-south dial 90, he must not walk so far that needle 84 passes the 15th unit division unless he makes some sort of notation of that fact. If for example, he were to walk 20 units due south, readout needle 84 would be pointed toward the 10th division on the left half of dial 90. Without any note of the fact that needle 84 had passed the 15th unit division going in a clockwise direction, he would think that he merely needed to walk 10 miles in a southerly direction in order to return to his point of origin. Obviously, this would merely carry him 10 miles farther from his point of origin. If the instrument is constructed such that the divisions on dials 90 and 91 represent distances of less than a mile, the problem tends to become more acute. However, the average hunter or hiker tends to roam or range in a number of different directions about his point of origin rather than concentrating his walking in only one direction away from his point of origin; hence, the problem is not particularly critical and does not detract from the value of the instrument. Furthermore, if a person knows that he might range more than 15 miles or other units in a given single direction from his point of origin he can easily remedy any difficulty merely by glancing occasionally at the dials 90 and 91 in order to determine whether or not needle 83 or 84 has passed the halfway point on its respective dial 91 or 90. Also, at any time the needles approach this point the instrument can be reset, using that location as a new point of origin. Of course if this procedure is followed a record must be kept, since the reverse procedure must be followed in order to return to the true point of origin.

It is apparent then, that this invention offers a major breakthrough in the art of navigating as it relates to walking. So far as is known, it is the first distance- and direction-integrating pedometer of any type ever conceived. Without making a single calculation, the person carrying this instrument can return without hesitation to his point of origin. There is no longer any need for the intent hunter to disregard his quest every time he changes direction and record distance and direction information. There is no longer any need for the person hiking to make calculations in order to return to his point of origin. Furthermore, since this instrument carries a compass, it is the only instrument which a person needs when out in the woods. This is true even if the instrument were not equipped with north pointer 100, since the person could return to his point of origin without ever taking a compass reading.

It is entirely conceivable that upon examining the foregoing disclosure, those skilled in the art may device particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

The embodiments of the invention in which an exclusive property or privilege is claimed are defined as follows:

1. A distance- and direction-indicating pedometer instrument, comprising: a pedometer means for producing an output proportional to distance traveled, said means having an actuator comprising an inertia pendulum which moves by gravity in response to the striding movements of a person carrying said instrument; a compass means for determining the direction of travel of such person; and means for combining and visually reading out correlated distance and direction data from said pedometer means and compass means, such that said person may determine the same by visual inspection.

2. The pedometer instrument of claim 1, wherein said means for combining and visually reading out data includes means for integrating the distance and direction information from said pedometer means and compass means, and for producing an integrated output thereof.

3. The pedometer instrument of claim 2, wherein said integrating means is a continuous integrator of instantaneous distance and direction information, and said integrated output continuously shows the instantaneous distance and direction back to a point of reference.

4. The pedometer instrument of claim 2, including means for interconnecting said pedometer means to said integrating means and for transferring mechanical energy from the former to the latter.

5. A distance- and direction-indicating pedometer instrument, comprising: a pedometer means for producing an output proportional to distance traveled, in response to the striding movements of a person carrying said instrument; a compass means for determining the direction of travel of such person; and means for correlating and visually reading out correlated distance and direction data from said pedometer means and compass means, such that said person may determine the same by visual inspection, said means for correlating and visually reading out data including means for integrating the distance and direction information from said pedometer means and compass means, and for producing an integrated output thereof; means for interconnecting said pedometer means to said integrating means and for transferring mechanical energy from the former to the latter, said integrating means including a sphere-shaped member mounted for rotation about a plurality of axes; said means for transferring energy causing such rotation of said sphere member; and said compass means determining the particular axis of said plurality thereof about which said rotation takes place.

6. The pedometer instrument of claim 5, including a first and a second rotatable element positioned in contact with said sphere; said first element registering at least a component part of rotation of said sphere representative of motion by said person along any vector of a first direction of travel; and said second element registering at least a component part of rotation of said sphere representative of motion by said person along any vector of a second direction which is perpendicular to said first direction.

7. The pedometer instrument of claim 6, wherein said first and second rotatable elements comprise wheels; said sphere member being rotatable about a plurality of axes lying in a predetermined plane through its center; said first and second wheels each lying in a plane which is generally parallel to said predetermined plane; and said first and second wheels contacting said sphere at points lying on great circles of said sphere whose planes are perpendicular to said predetermined plane and to each other.

8. The pedometer instrument of claim 7, wherein said point of contact of said first wheel also lies on a minor circle of said sphere whose plane is parallel to that of said predetermined plane; said point of contact of said second wheel also lying on a minor circle of said sphere whose plane is parallel to that of said given plane.

9. The pedometer instrument of claim 8, wherein said first and second wheels lie generally in the same plane; and the plane of said wheels being located a distance from said predetermined plane which approaches the radius of said sphere.

10. The pedometer instrument of claim 5, wherein said pedometer means includes means for storing energy generated by a plurality of successive steps taken by said person and discharging stored quantities of such energy; and a sphere-rotating means for receiving discharged quantities of energy and rotating the sphere in response thereto.

11. The pedometer instrument of claim 10, wherein said means for storing and discharging energy includes an axle having a lateral extension and having a camming surface; a spring anchored at one end and connected at the other end to said lateral extension; a sphere-rotating means; means for rotating said axle a predetermined amount in response to each step of said person, thereby turning said lateral extension loading said spring by elastically deforming it and for releasing said axle when said spring is loaded a predetermined amount, such that said axle is rapidly rotated by said spring; said camming surface operably contacting said sphere-rotating means during said rapid rotation of said axle; and said sphere-rotating means imparting rotation to said sphere in response to the operation of said camming surface.

12. The pedometer instrument of claim 11, wherein said sphere-rotating means includes a member having a needlelike portion mounted for movement into contact with said sphere to cause rotation thereof.

13. The pedometer instrument of claim 12, wherein said compass means includes a magnet coupled to said member to move the latter with respect to said sphere.

14. The pedometer instrument of claim 12, including a lever means pivotally mounted in alignment with said camming surface and with said needlelike member; and a shaft supporting said needlelike member for guided movement; said camming surface contacting said lever means during said rapid axle rotation and moving said lever means sufficiently to cause the latter to move said needlelike member into contact with said sphere and rotate the latter.

15. The pedometer instrument of claim 14, wherein said compass means includes a magnet coupled to said member to move the latter with respect to said sphere.

* * * * *